(12) United States Patent
Raszka et al.

(10) Patent No.: US 7,400,795 B2
(45) Date of Patent: Jul. 15, 2008

(54) LIGHT CONDUITS HAVING PERIPHERAL, SHAPE-DEFINING POLYMER OVERMOLDS

(75) Inventors: Scott A. Raszka, Woodstock, CT (US); Kevin Tabor, Webster, MA (US); Paulettel Onorato, Sudbury, MA (US)

(73) Assignee: Schott Corporation, Elmsford, NY (US)

( * ) Notice: Subject to any disclaimer, the term of this patent is extended or adjusted under 35 U.S.C. 154(b) by 0 days.

(21) Appl. No.: 11/973,177

(22) Filed: Oct. 6, 2007

(65) Prior Publication Data

US 2008/0107387 A1 May 8, 2008

Related U.S. Application Data

(60) Provisional application No. 60/857,399, filed on Nov. 7, 2006.

(51) Int. Cl.
*G02B 6/26* (2006.01)
*G02B 6/036* (2006.01)

(52) U.S. Cl. .................. 385/31; 385/123; 385/126; 385/127; 385/128

(58) Field of Classification Search .............. 385/31, 385/123, 126–128; 264/1.24; 427/163.2
See application file for complete search history.

(56) References Cited

U.S. PATENT DOCUMENTS 6,385,362 B1 * 5/2002 Norwood .................. 385/14

* cited by examiner

*Primary Examiner*—Frank G Font
*Assistant Examiner*—Michael P Mooney
(74) *Attorney, Agent, or Firm*—Louis J. Franco; Law Office of Louis J. Franco

(57) ABSTRACT

An elongated light-guiding element includes opposed incident and emission ends between which light propagates by total internal reflection. The light-guiding element includes a glass core with first and second glass core ends and a glass-core outer surface. A non-glass polymeric optical layer extends over at least a portion of the length of the glass core and is disposed peripherally thereabout. The optical layer has first and second optical-layer ends and an optical-layer exterior surface extending between the first and second optical-layer ends. The glass core and the polymeric optical layer exhibit indices of refraction that are matched to one another as closely as practicable such that the combination of the glass core and the optical layer exhibits optical properties similar to those that would be exhibited by an optical element of similar shape and dimensions fabricated from a single, continuous mass of optical material having a refractive index equal to the that of the glass core material.

15 Claims, 7 Drawing Sheets

View into plane IA

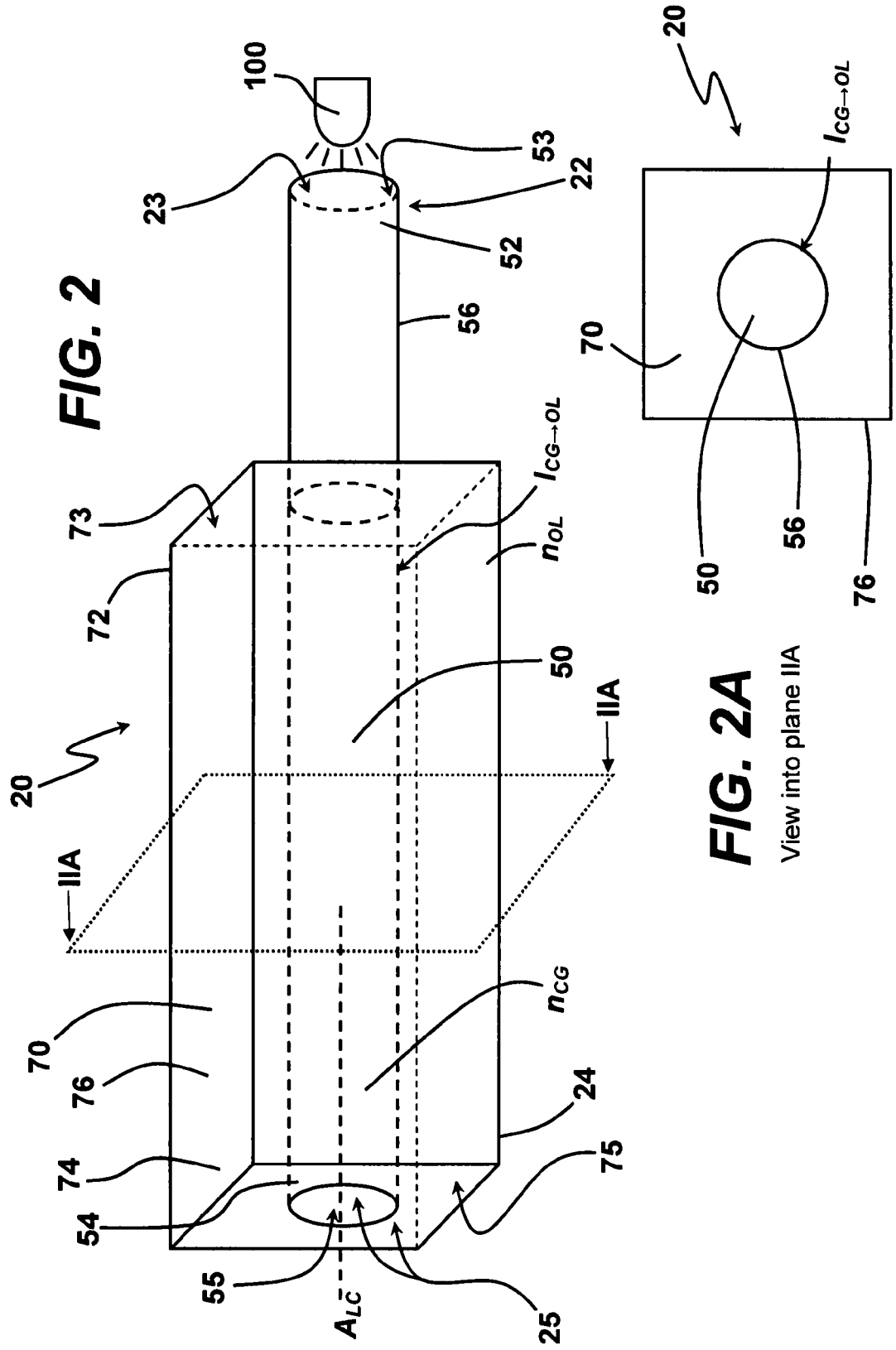

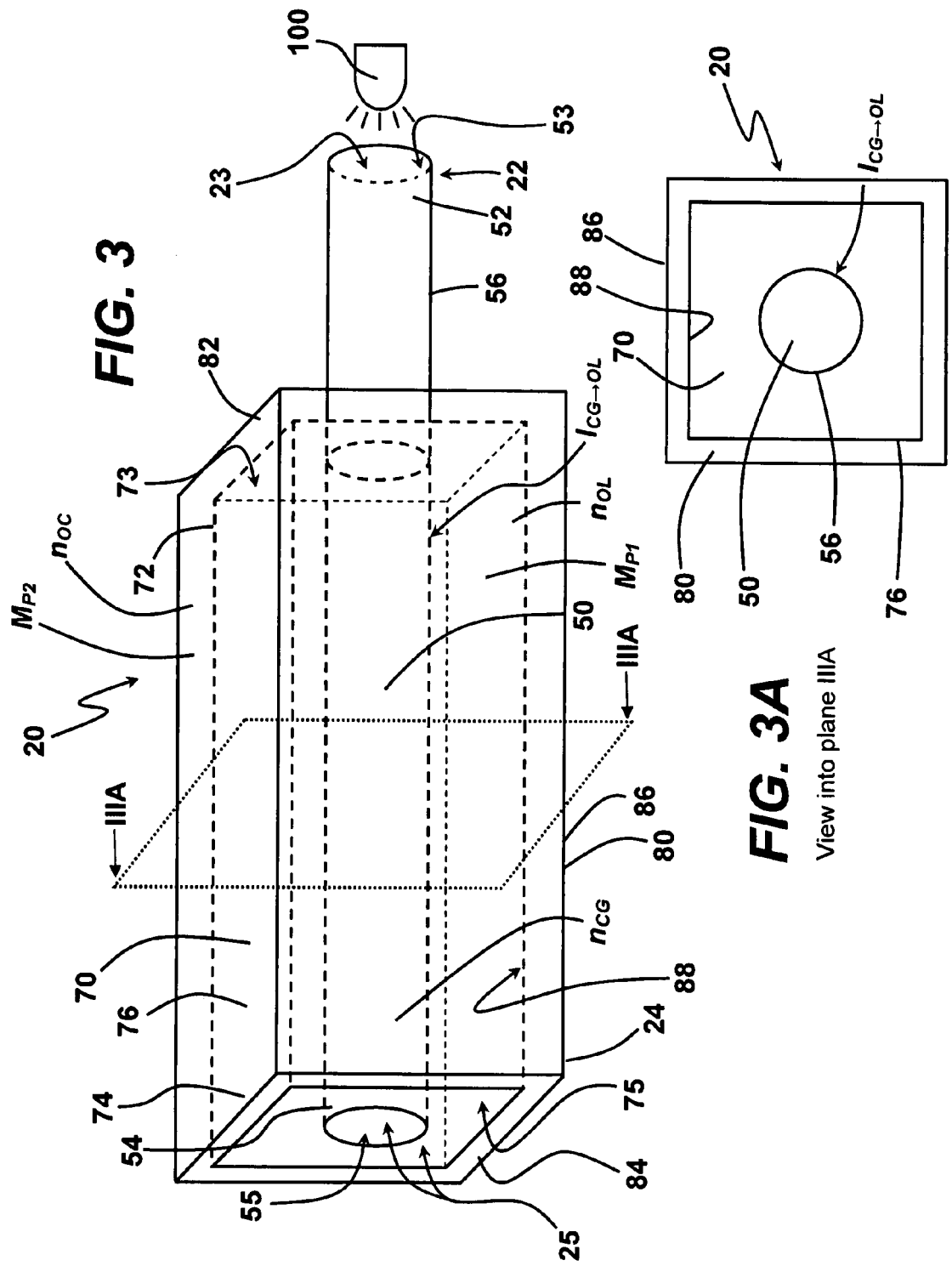

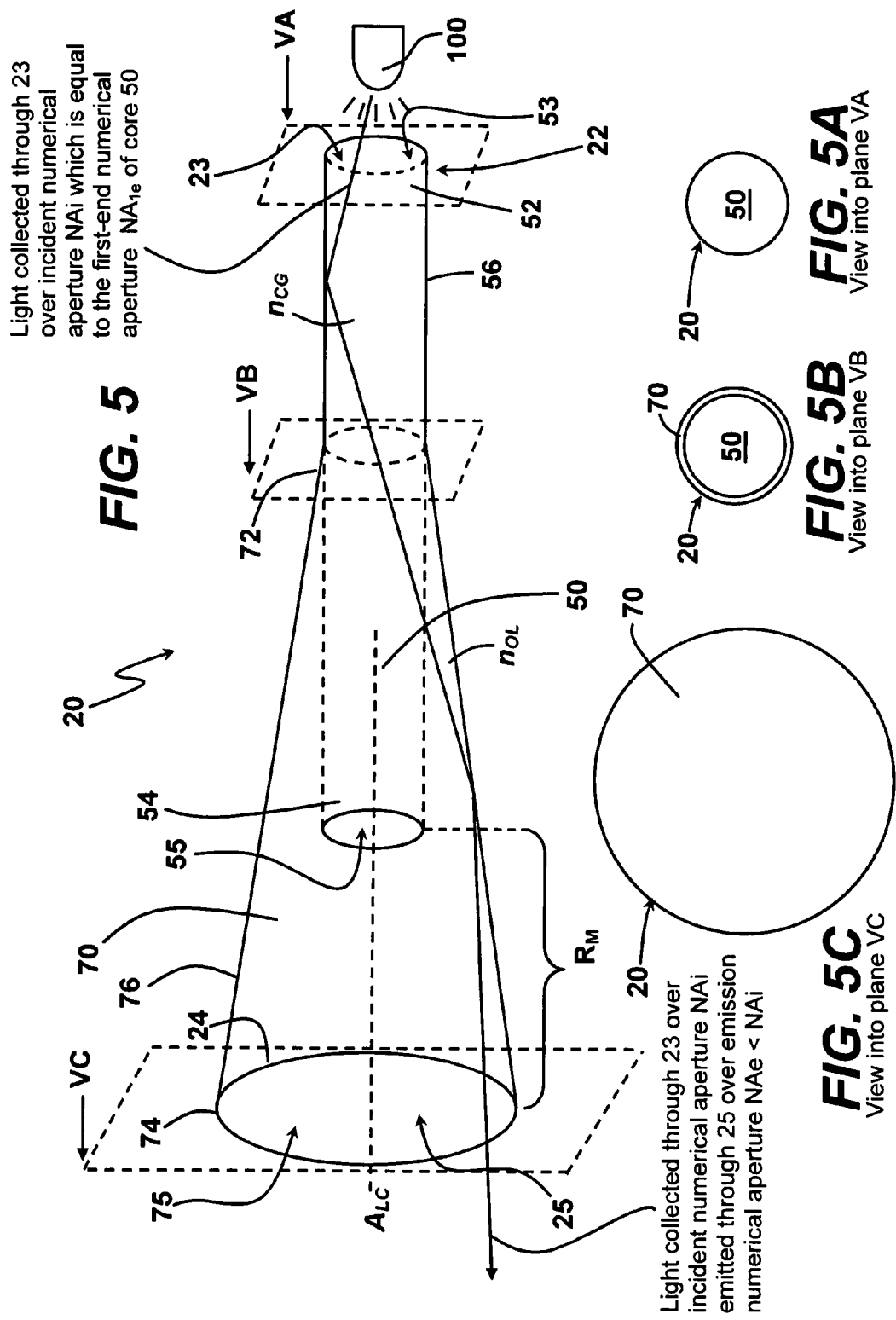

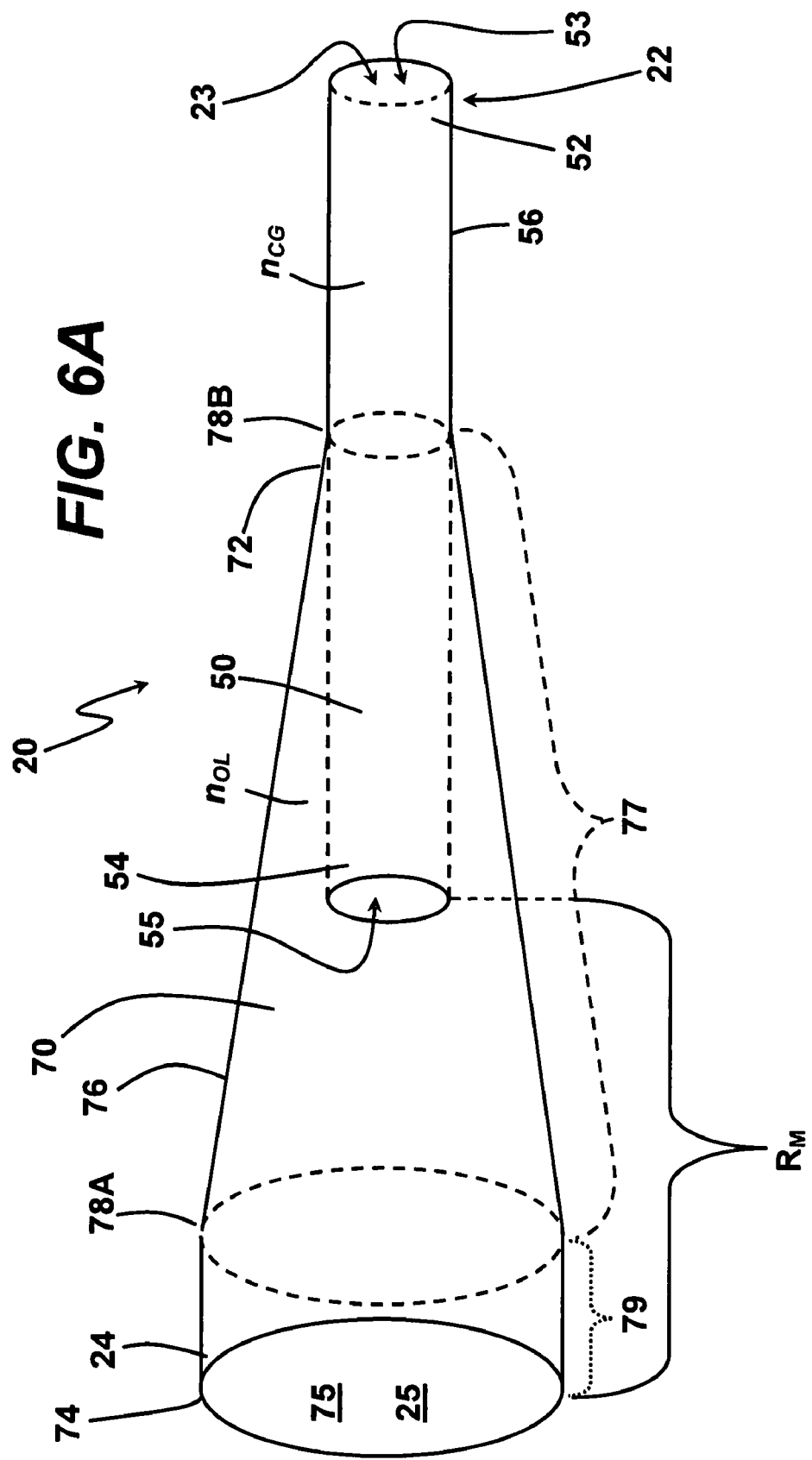

LIGHT CONDUITS HAVING PERIPHERAL, SHAPE-DEFINING POLYMER OVERMOLDS

PROVISIONAL PRIORITY CLAIM

Priority based on Provisional Application Ser. No. 60/857, 399, filed Nov. 7, 2007, and entitled "LIGHT CONDUITS HAVING PERIPHERAL, SHAPE-DEFINING POLYMER OVER-MOLDS" is claimed. Moreover, the entirety of the previous provisional application, including the drawings, is incorporated herein by reference as if set forth fully in the present application. Disclosure Document No. 596957 entitled POLYMER OVER-MOLDED GLASS RODS is also referenced and relied upon for purposes of establishing an independently verified and recorded date of conception of no later than Feb. 28, 2006.

BACKGROUND

1. Field

Although not so limited in its utility or scope, implementations of the present invention are particularly well suited for the fabrication of variously configured optical fiber components including optical fiber tapers.

2. Brief Description of Illustrative Environments and Related Art

Manufacturers of optical fiber components encounter circumstances in which the outer or "peripheral" geometry of a single light-conductive element, or a unitary bundle of the same, must be one that does not generally result conveniently from the well-known heating and drawing process. In addition, some applications require the formation of what are known in the industry as a "tapers." A taper, as the name implies, is a light-conductive component the cross-sectional area of which increases or decreases as a function of displacement along the longitudinal axis of the component. Traditional methods of achieving an irregular or varying peripheral geometry include (i) heating glass within a mold of desired shape, (ii) molding a form from glass "gobs" and, for the formation of tapers, (iii) heating and stretching a central portion of a glass component in order to form a region of gradually decreasing cross-sectional area. Although difficulties are encountered in connection with the formation of optical fiber components having special cross-sectional configurations of constant cross-sectional area, even more challenging is the formation of tapered components generally and, more particularly, tapered components exhibiting unusual cross-sectional geometries (e.g., other than round or square).

Designers and fabricators of optical fiber components are familiar with variously configured optical fiber "tapers" formed for alternative applications including, for example, (i) use as image reducers/enlargers and (ii) the alteration of numerical aperture along an optical path. For the former application, a taper typically includes a plurality of internally-reflecting light conduits (e.g., light-conductive fibers), each of which conduits conducts a portion (e.g. a "pixel") of an image introduced into one end of the taper for communication to the opposite end where the numerous pixels combine to form either a reduced or enlarged image. A taper of the type used to alter numerical aperture typically includes opposed incident and emission ends, an optical core extending between the incident and emission ends and an optical cladding disposed about the core, wherein the core and cladding exhibit relative refractive indices that facilitate light propagation by total internal reflection between the incident and emission ends. Depending on whether the numerical-aperture alteration taper is implemented to reduced or increase the numerical aperture along the optical path into which it is situated, the taper is oriented such that the small end (i.e., the end of smaller cross-sectional geometry) serves as one of the incident and emission ends and the large end serves as the other of the incident and emission ends. As is known to those in the field, the opposed small and large ends exhibit, respectively, a small-end numerical aperture and a large-end numerical aperture lower in magnitude than the small-end numerical aperture.

An illustrative traditional method of fabricating a numerical-aperture alteration taper begins with the creation of a basic internally-reflecting light conduit comprising a cladding material collapsed about a core material and exhibiting a uniform cross-sectional geometry and area. Known to those of skill in the relevant arts is that such a conduit exhibits a numerical aperture the mathematical expression for which is $NA=(n_1^2-n_2^2)^{1/2}$ where $n_1$ represents the refractive index of the core material and $n_2$ represents the refractive index of the cladding material. An intermediate portion of the basic light conduit is heated and stretched such that the intermediate portion is gradually constricted and exhibits a diameter and cross-sectional area that varies with position along the length of the conduit within the stretched intermediate portion (i.e., transition region) such that the basic conduit assumes what is referred to in the art as an "hour glass" shape. If the basic conduit is cut at the center of the transition region, for example, two tapered conduits are formed each of which tapered conduits includes a tapered segment and a segment of relatively constant diameter and cross-sectional area. It will be appreciated that, if desired, a taper exhibiting a diameter and a cross-sectional area that vary over its full length may also be cut from the transition region or from the tapered segment of a tapered conduit. As previously explained, a cladded-core taper made in accordance with the aforementioned or some alternative method includes opposed small and large ends. The small end of the taper exhibits a numerical aperture corresponding to the numerical aperture of the basic light conduit from which the taper was formed, a phenomenon that is generally true regardless of from where along the transition region the small end was cut. However, the larger end exhibits a different numerical aperture that is lower in magnitude than the numerical aperture of the small end of the taper. The value of the numerical aperture at the large end is equal to the inverse of the magnification ratio of the taper multiplied by the numerical aperture of the basic light conduit from which the taper was formed. Accordingly, in going from the small end to the large end, the magnitude of the numerical aperture of the taper is reduced. Among the disadvantages of a taper fabrication method such as that described above are the facts that the process is (i) time consuming and (ii) difficult to replicate precisely over multiple components, thereby frequently resulting in unacceptable variations in dimensional precision among components fabricated pursuant to the same specification requirements.

For some applications, specially-configured optical components can be formed from a molded translucent polymeric material (e.g., plastic), thereby obviating many of the physical difficulties of working with glass. However, when exposed to ultraviolet light and intense heat over sustained periods of time, plastics breakdown and eventually fail. Consequently, polymeric optical components have proven ill-suited for applications in which they are placed in close proximity to intense heat and ultraviolet sources.

Accordingly, there is a need for specially shaped light conduits that are more convenient to precisely and consistently form than glass conduits, but that exhibit the durability of glass when exposed to ultraviolet light.

SUMMARY

In accordance with a first illustrative set of embodiments, a light-guiding element has longitudinally opposed incident and emission ends between which light is transmitted by internal reflection. The incident and emission ends of the light-guiding element include, respectively, an incident face through which light is introduced into the light-guiding element and an emission face through which light introduced through the incident face is emitted. The light-guiding element includes an optical glass core extending along a core axis with longitudinally opposed first and second glass-core ends and a glass-core outer surface extending longitudinally between the first and second glass-core ends. The glass core is optically transmissive and exhibits a glass-core refractive index. The first glass-core end coincides with the incident end of the light-guiding element.

Disposed peripherally about the outer surface of the glass core as viewed into a plane orthogonal to a longitudinal core axis, and extending over a predetermined portion of the length thereof, is an optically transmissive optical layer having first and second optical-layer ends and an optical-layer exterior surface extending between the first and second optical layer ends. The optical layer is formed from a first non-glass polymeric material having an optical-layer refractive index corresponding as closely as practicable to the glass core refractive index such that (a) the glass core and optical layer combine to form a light-guiding element that behaves as similarly as practicable to a light-guiding element fabricated from a single, continuous mass of optical material having a refractive index equal to the glass-core refractive index and (b) when the optical layer of the light-guiding element is surrounded by a material having a refractive index lower than the optical-layer refractive index, light received into an incident end of the light-guiding element is transmitted through a portion of the length of the light-guiding element including a portion of the length of the glass-core and a portion of the length of the optical layer by internal reflection.

In various alternative versions, an optical cladding is disposed about the optical layer. The optical cladding comprises a second non-glass polymeric material having an optical-cladding refractive index lower than the optical-layer refractive index in order to facilitate the transmission of light through the light-guiding element by total internal reflection. Versions lacking an optical cladding over the optical layer are more suited for use in environments in which the optical layer is surrounded by an optically transmissive medium having a refractive index lower than the optical-layer refractive index in order to facilitate the transmission of light through the light-guiding element by total internal reflection. Suitable transmissive media for facilitating total internal reflection through a cladless light-guiding element include fluids in either a gaseous or liquid phase such as, by way of non-limiting example, air and water.

In various alternative versions, the optical glass core is a core rod having (i) a uniform cross-sectional area as viewed into spatially separated and mutually parallel planes orthogonal to the core axis, (ii) a uniform cross-sectional geometry as viewed into spatially separated and mutually parallel planes orthogonal to the core axis, and (iii) a first-end numerical aperture over which light is received into the first glass-core end. The polymeric optical layer (or overmold) is tapered so as to include opposed small and large ends corresponding to, respectively, the first and second optical-layer ends between which the optical-layer exterior surface extends. In several embodiments, the large end of the tapered optical layer is more distant than the small end from the first glass-core end and coincides with the emission end of the light-guiding element. Light received into the first glass-core end over the first-end numerical aperture is emitted from the emission end of the light-guiding element over an emission-end numerical aperture that is lower in magnitude than the first-end numerical aperture.

In still additional versions, the first and second glass-core ends include, respectively, a first glass-core face coinciding with the incident face of the light-guiding element and a second glass-core face longitudinally opposite the first glass-core face. The second optical-layer end includes a second optical-layer face that constitutes an optical-layer emission face and coincides with the emission face of the light-guiding element. In order to facilitate the intermixing of light emitted from the second glass-core face and light emitted through the glass-core outer surface, the second glass-core face is recessed with respect to the optical-layer emission face and embedded within the non-glass polymeric material from which the optical layer is formed such that there is defined between the second glass-core face and the optical-layer emission face a light-mixing region.

Representative, non-limiting embodiments are more completely described and depicted in the following detailed description and the accompanying drawings.

BRIEF DESCRIPTION OF THE DRAWINGS

FIG. 2 depicts an alternative light-guiding element in which the cross-sectional geometry of the glass core differs from that of the polymeric optical layer and in which a portion of the length of the glass core protrudes from the optical layer;

FIG. 2A is a cross-sectional view into the plane IIA of FIG. 2;

FIG. 3 shows an illustrative light-guiding element that is similar to that of FIG. 2, but in which there is disposed peripherally about the polymeric optical layer an optical cladding formed from a non-glass polymeric material and having an optical-cladding refractive index lower than that optical-cladding refractive index;

FIG. 3A is a cross-section of the light-guiding element of FIG. 3 as viewed into the plane IIIA;

FIG. 5 shows a version of a light-guiding element including a glass core of uniform cross-sectional geometry and area along its length and a polymeric optical layer that is tapered downwardly from the emission end of the light-guiding element toward the incident end of the light-guiding element;

FIG. 5A is a cross-section of the light-guiding element of FIG. 5 as viewed into the plane VA;

FIG. 5B is a cross-section of the light-guiding element of FIG. 5 as viewed into the plane VB;

FIG. 5C is a cross-section of the light-guiding element of FIG. 5 as viewed into the plane VC;

FIG. 6A depicts an embodiment of a light-guiding element including a tapered overmold with opposed first and second overmold ends, wherein (i) the second overmold end is larger than the first overmold end and (ii) situated between the first and second overmold ends are a tapered region having large and small ends and a relatively non-tapered region extending between the large end of the tapered region and the second overmold end.

DETAILED DESCRIPTION

Figure 1:
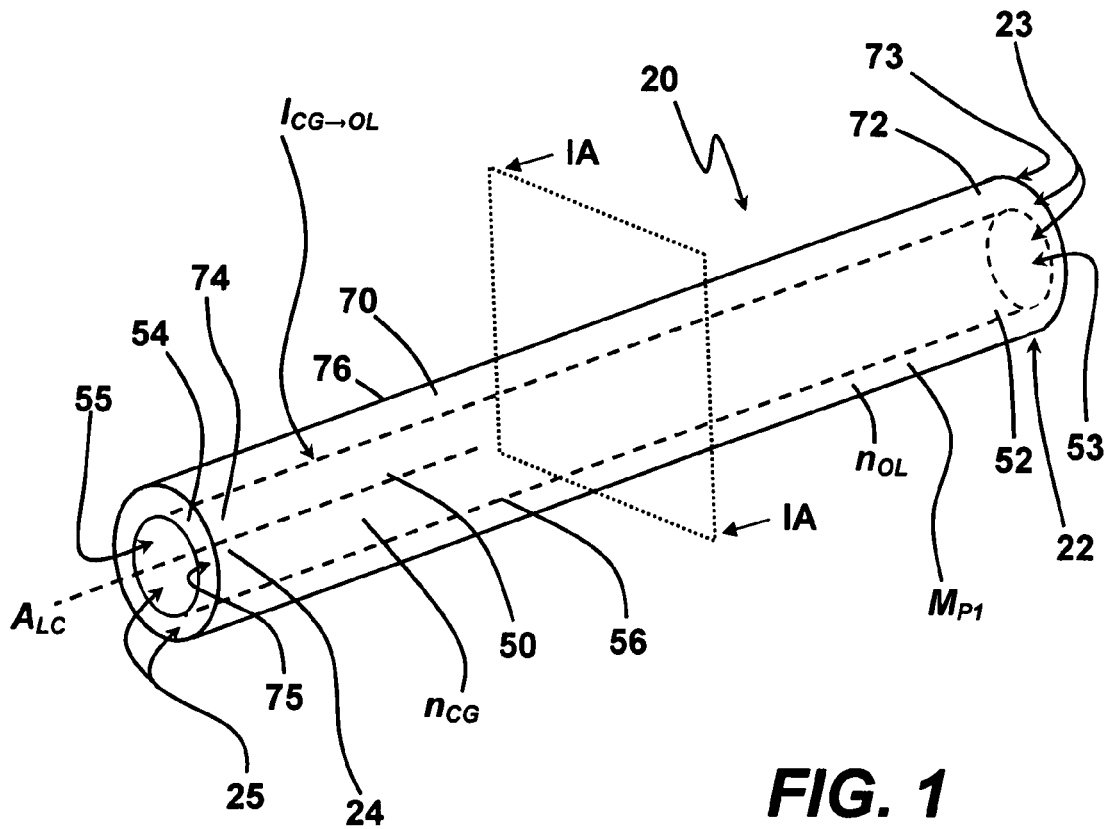
FIG. 1 depicts a light-guiding element having a glass core with glass-core refractive index and a non-glass polymeric optical layer disposed peripherally about the glass core and having an optical-layer refractive index selected to correspond to the glass-core refractive index as closely as practicable.

The following description of various embodiments of a light-guiding element including a polymeric optical layer is illustrative in nature and is therefore not intended to limit the scope of the invention or its application of uses. Among the various illustrative versions depicted in the drawings, like reference characters correspond to similar or analogous components.

Referring to FIG. 1, an illustrative light-guiding element 20 has opposed incident and emission ends 22 and 24 between which light is transmitted by internal reflection. The light-guiding element 20 includes an optical glass core 50 that has longitudinally opposed first and second glass-core ends 52 and 54, and an outer surface 56 extending longitudinally between the first and second glass-core ends 52 and 54. The glass core 50 is optically transmissive and exhibits a glass-core refractive index $n_{GC}$.

Disposed peripherally about the outer surface 56 of the glass core 50 as viewed into a plane orthogonal to a longitudinal core axis $A_{LC}$ (FIG. 1A), and extending over at least a predetermined portion of the length of the glass core 50, is an optical layer 70. The optical layer 70 has first and second optical-layer ends 72 and 74 and an optical-layer exterior surface 76 extending between the first and second optical layer ends 72 and 74. The optical layer 70 is formed from a first non-glass polymeric material $M_{P1}$ having an optical-layer refractive index $n_{OL}$. The glass-core refractive index $n_{GC}$ and the optical-layer refractive index $n_{OL}$ are selected to correspond as closely as practicable to one another so as to minimize refraction of light crossing the interface $I_{CG \to OL}$ at which the glass core 50 and the optical layer 70 meet. By matching the glass-core and optical-layer refractive indices $n_{GC}$ and $n_{OL}$ as closely as practicable, the glass core 50 and optical layer 70 combine to form a light-guiding element 20 that behaves as similarly as practicable to a light-guiding element fabricated from a single, continuous mass of optical material having a refractive index equal to the glass-core refractive index $n_{GC}$, for example. Accordingly, when the optical layer 70 is surrounded by a material having a refractive index lower than the optical-layer refractive index $n_{OL}$, light received into the incident end 22 of the light-guiding element 20 is transmitted through a portion of the length of the light-guiding element 20 including a portion of the length of the glass-core 50 and a portion of the length of the optical layer 70 by internal reflection.

Figure 1A:
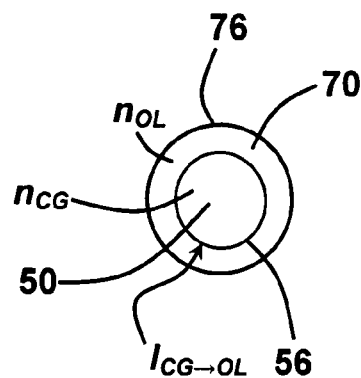
FIG. 1A is a view into the cross-sectional plane IA of FIG. 1.

In the generic illustrative embodiment of FIGS. 1 and 1A, both the first glass-core end 52 and the first optical-layer end 72 coincide with the incident end 22 of the light-guiding element 20. Similarly, the second glass-core end 54 and the second optical-layer end 74 coincide with the emission end 24 of the light-guiding element 20. Moreover, both the glass core 50 and the optical layer 70 are cylindrical. In the following paragraphs, various embodiments deviating in one or more aspects found in the illustrative embodiment of FIGS. 1 and 1A are described.

Referring to FIGS. 2 and 2A, an illustrative version is shown in which the cross-sectional geometry of the glass core 50 is dissimilar to that of the optical layer 70 disposed over a portion of the length of the glass core 50. While in the specific version of FIGS. 2 and 2A the glass core 50 is cylindrical and the optical layer 70 defines for that portion of the light-guiding element 20 over which it is disposed a square cross section as viewed into a plane IIA extending orthogonally to the longitudinal core axis $A_{LC}$, it will be readily appreciated that this version is merely representative of the more general principle that the glass core 50 and the optical layer 70 can exhibit disparate cross-sectional geometries. Configurations in which the geometries of the glass core 50 and the optical layer 70 differ simplify fabrication of each light-guiding unit and render simpler the fabrication of multiple units that deviate less from a design plan, and one another, than, for example, light-guiding elements that are heated and drawn only. As mentioned in the background, manufacturers of optical fiber components encounter circumstances in which the outer or "peripheral" geometry of a single light-conductive element, or a unitary bundle of the same, must be one that does not generally result conveniently from the well-known heating and drawing process or even from the molding of glass in a form. Accordingly, various methods of fabricating light-guiding elements 20 within the scope and contemplation of the invention include fabricating a glass core 50 of convenient and readily replicable cross-sectional geometry (e.g., round or square) and then depositing the optical layer 70 over the glass core 50. In various versions, the optical layer 70 is deposited over the glass core 50 within a mold (e.g., an injection mold) that defines the length and peripheral configuration of the optical layer 70. In alternative illustrative versions, the glass core 50 is at least partially encapsulated within the polymeric material by (i) thermoplastic molding or (ii) through use of a two-part resin/catalyst (e.g. optical epoxy) to form the optical layer 70 within a mold. In alternative versions, materials from which the optical layer 70 can be formed include, by way of non-limiting example, at least one of an optics-grade translucent polyurethane; a polycarbonate, a polymethylmeythacrylate and an acrylic. Because techniques for molding polymers about components in a general sense are known widely by those of ordinary skill in the arts to which the current invention pertains, no specific explanation or illustrative depictions are provided. To the extent that the optical layer 70 can molded about the glass core 50, the optical layer 70 may be referred to alternatively in the specification and claims as an "overmold." The term "overmold" may also be used in place of "optical layer" when referring to characteristics and physical parts such as "overmold refractive index" and "overmold exterior surface" instead of "optical-layer refractive index" and "optical-layer exterior surface." Therefore, by way of non-limiting example, while the term "overmold exterior surface" does not appear literally in the detailed description, except in association with the current example, the term "optical-layer exterior surface" does and is to be regarded as antecedent basis for the use of "overmold exterior surface" in the claims because this amounts to no more than a substitution of "overmold" for "optical-layer."

The version of FIG. 2 exhibits another aspect associated with various versions. More particularly, unlike the version of FIG. 1 in which the first glass-core end 52 and the first optical-layer end 72 include, respectively, a first glass-core face 53 and a first optical-layer face 73 that each form a part of the overall incident face 23 of the light-guiding element 20, the version of FIG. 2 includes a first optical-layer face 73 that is recessed with respect to the first glass-core face 53. In the latter version, the first glass-core end 52 and the first glass-core face 53 correspond respectively to the incident end 22 and the incident face 23 of the light-guiding element 20, while the first optical-layer end 72 and its first optical-layer face 73 are situated between the incident and emission ends 22 and 24 and faces 23 and 25 of the light-guiding element 20. In each of the versions of FIGS. 1 and 2, the second glass-core face 55 and the second optical-layer face 75 coincide with, and combine to form, the emission face 25 of the light-guiding element 20.

In still another alternative version, depicted in FIGS. 3 and 3A, a light-guiding element 20 including, like the versions of FIGS. 1 and 2, a glass core 50 and a polymeric optical layer 70, further includes an optical cladding 80 disposed peripherally about the optical layer 70 and extending longitudinally over a portion of the length thereof. The optical cladding 80 includes opposed first and second cladding ends 82 and 84 and cladding outer and inner surfaces 86 and 88 extending longitudinally between the first and second cladding ends 82 and 84. Like the optical layer 70, which is fabricated from a first non-glass polymeric material, the optical cladding 80 is fabricated from a second non-glass polymeric material $M_{P2}$. The optical cladding 80 has an optical-cladding refractive index $n_{OC}$ that is lower in magnitude than the optical-layer refractive index $n_{OL}$ in order to facilitate the transmission of light through the light-guiding element by total internal reflection. The versions of FIGS. 1 and 2 differ from that of FIG. 3 in that the versions of FIGS. 1 and 2 lack a cladding layer 80. Accordingly, light-guiding elements 20 such as those of FIGS. 1 and 2 are more suited for use in an environment in which the optical layer 70 is surrounded by an optically transmissive medium having a refractive index lower than the optical-layer refractive index in order to facilitate the transmission of light through the light-guiding element 20 by total internal reflection. Conducive optically transmissive media include, by way of non-limiting example, fluids such as (i) gaseous matter comprising at least one gas (e.g., air) and (ii) matter in a liquid phase, such as water, for instance.

Like the version of FIG. 2, the version of FIG. 3 is configured such that a portion of the glass core 50 protrudes from, and extends beyond, the first optical-layer end 72. Versions generally incorporating this feature are envisioned as particularly suitable for applications in which the light to be introduced into the incident end 22 of the light-guiding element 20 through the incident face 23 at least one of (i) includes ultraviolet radiation and (ii) is unacceptably hot for situating in close proximity to polymeric material. More specifically, polymeric materials break down with sustained, proximate exposure to sources of either heat or ultraviolet light. Configurations such as those in FIGS. 2 and 3 facilitate the introduction of light from a light-emitting element 100 that is at least one of (i) hot and (ii) inclusive of ultraviolet light by situating the first glass-core face 53 in light-receiving proximity with the light-emitting element 100 while maintaining a desired distance between the polymeric optical layer 70 and the light-emitting element 100.

Although versions of the invention are such that the glass-core and optical-layer refractive indices $n_{GC}$ and $n_{OL}$ are matched as closely as practicable, the fact is that light will propagate somewhat differently within these disparate materials. Accordingly, various versions are configured in order to facilitate uniformity in the light that is emitted from the emission face 25 of the light-guiding element 20. More specifically, with reference to FIG. 4, various versions are configured such that the second optical-layer face 75 (alternatively, optical-layer emission face 75) coincides with, and constitutes, the emission face 25 of the light-guiding element 20, but the second glass-core face 55 of the second glass-core end 54 is recessed with respect to the emission face 25 and embedded within the first non-glass polymeric material $M_{P1}$ from which the optical layer 50 is fabricated. Versions configured in the foregoing manner facilitate the mixing within the optical layer 70 of light that is emitted from the second glass-core face 55 with light that is emitted through the glass-core outer surface 56 in a mixing region $R_M$ that extends longitudinally between the second glass-core face 55 and the emission face 25 of the light-guiding element 20.

As discussed in the background, various applications require the implementation of numerical-aperture alteration tapers in order to reduce or increase the numerical aperture at which light is emitted relative to the numerical aperture over which it is received into a light-guiding element. Shown in FIG. 5 is an illustrative light-guiding element 20 configured for the acceptance of light through its incident face 23 over an incident numerical aperture $NA_i$ and the emission of accepted light through its emission face 25 over an emission numerical aperture $NA_e$ that is lower in magnitude than the incident numerical aperture $NA_i$. It will be appreciated in connection with the version of FIG. 5 that, because the second optical-layer face 75 coincides with, and constitutes, the emission face 25 of the light-guiding element 20, the emission numerical aperture $NA_e$ is equal to the large-end numerical aperture of the tapered optical layer 70. The glass core 50 is a rod having a uniform cross-sectional area and a uniform cross-sectional geometry over its length (i.e., as viewed into longitudinally separated, and mutually parallel, planes (e.g., planes VA and VB) orthogonal to the longitudinal core axis $A_{LC}$. The polymeric optical layer 70 is in the form of a taper having opposed small and large ends which, in the illustrative embodiment of FIG. 5, correspond to, respectively, the first and second optical-layer ends 72 and 74 between which the optical-layer exterior surface 76 extends.

Figure 4:
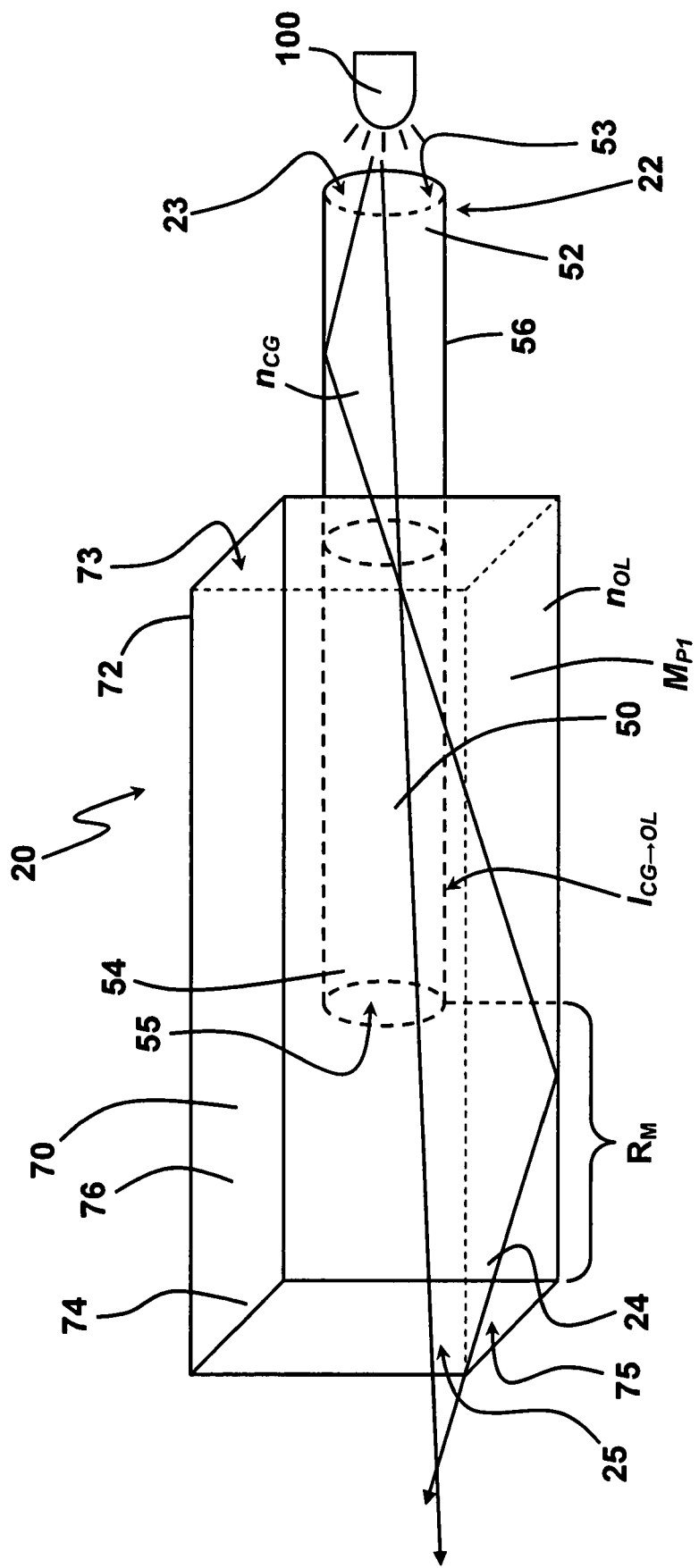
FIG. 4 depicts an alternative embodiment including a light-mixing region situated longitudinally between the second glass-core face and the second optical-layer face.

The version of FIG. 5 shares in common with the versions of FIGS. 2, 3 and 4 the feature that the glass-core 50 protrudes from the first optical-layer end 72 for some distance such that the first-optical layer end 72 is situated between the first glass-core face 53 and the emission end 24 of the light-guiding element 20. Accordingly, in the version of FIG. 5, the glass core 50 is configured to receive light through the first glass-core face 53 over a first-end numerical aperture $NA_{1e}$ that is the incident numerical aperture $NA_i$ for the light-guiding element 20.

Figure 6B:
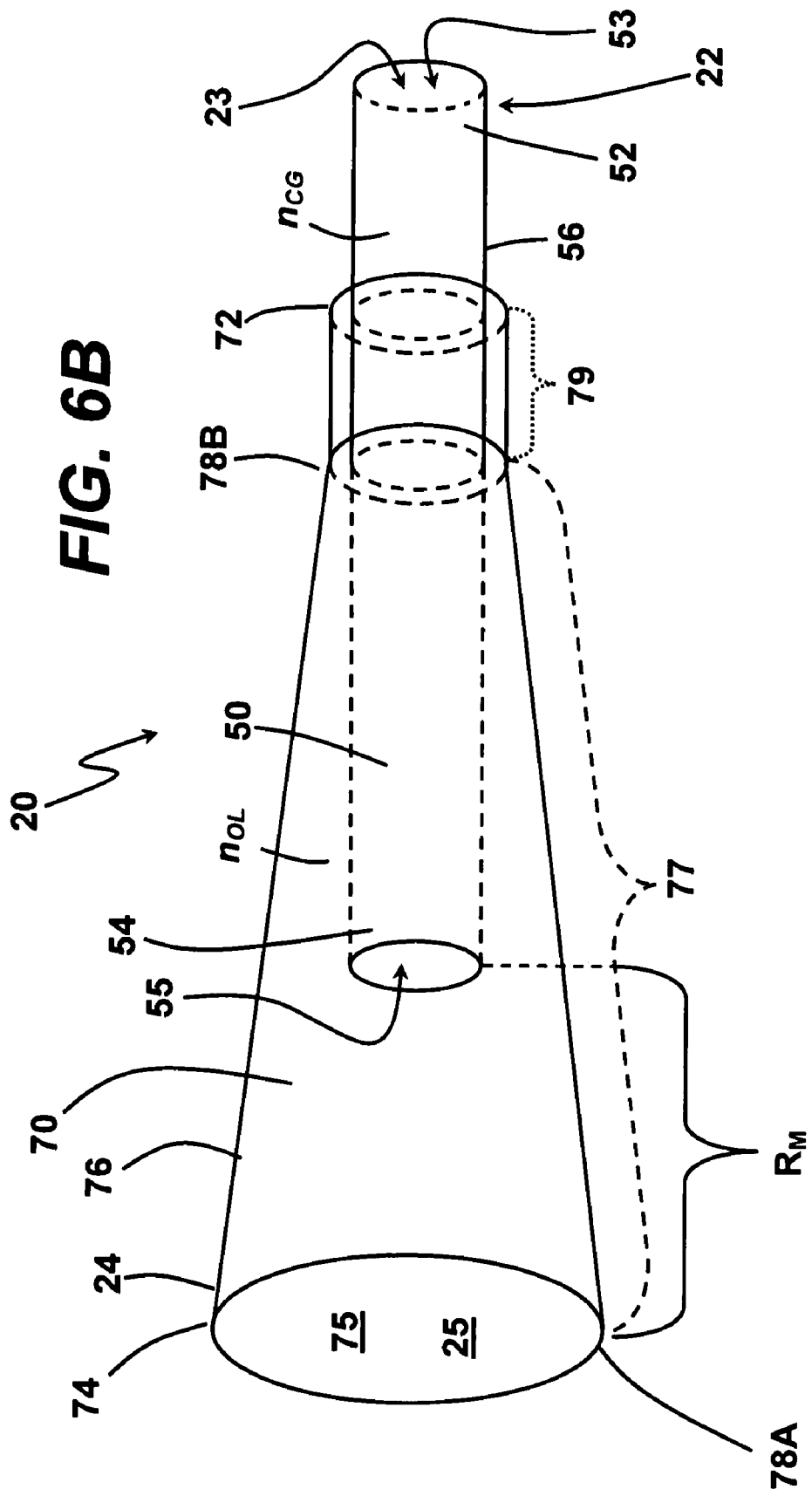
FIG. 6B depicts an embodiment of a light-guiding element including a tapered overmold with opposed first and second overmold ends, wherein (i) the first overmold end is smaller than the second overmold end and (ii) situated between the first and second overmold ends are a tapered region having large and small ends and a relatively non-tapered region extending between the small end of the tapered region and the first overmold end.

The tapered optical layer 70 in the illustrative version of FIG. 5 is oriented and configured such that the larger, second optical-layer end 74 coincides with the emission end 24 of the light-guiding element 20. At the second optical-layer end 74, the cross-sectional area of the light-guiding element 20, as viewed into a plane VC orthogonal to the longitudinal core axis $A_{LC}$, is larger than the cross-sectional area of the light-guiding element 20 at the first optical-layer end 72, as viewed into a plane VB that is parallel to, and longitudinally spaced from, the plane VC. While the representative polymeric optical-layer 70 of FIG. 5 is tapered over its entire length between the first and second optical-layer ends 72 and 74, it is to be understood that versions in which the tapered optical-layer includes at least one portion along its length that is not tapered are within the scope and contemplation of the invention as expressed in this description and the appended claims. For instance, in one alternative version, shown in a FIG. 6A, the tapered portion 77 of the optical layer 70 has longitudinally opposed large and small ends 78A and 78B. The large end 78B is distinct and longitudinally separated from the second optical-layer end 74 such that a relatively non-tapered region 79 is defined between the large end 78B of the tapered portion 77 and the second optical-layer end 74. Similarly, in another alternative version shown in a FIG. 6B, the tapered portion 77 of the optical layer 70 has a small end 78B that is distinct and longitudinally separated from the first optical-layer end 72 such that a relatively non-tapered region 79 is defined between the small end 78B of the tapered portion 77 and the first optical-layer end 72. Moreover, in the particular illustrative version of FIG. 6B, the large end 78A of the tapered portion 77 coincides with the second optical-layer end 74 and the emission end 24 of the light-guiding element 20. However, it is to be understood that versions including two relatively non-tapered portions 77—one between the small end 78B and the first optical-layer end 72 and one between the large end 78A and the second optical-layer end 74—are within the scope and contemplation of the invention as expressed in the appended claims excepting each claim that is explicitly limited to a contrary interpretation.

The foregoing is considered to be illustrative of the principles of the invention. Furthermore, since modifications and changes to various aspects and implementations will occur to those skilled in the art without departing from the scope and spirit of the invention, it is to be understood that the foregoing does not limit the invention as expressed in the appended claims to the exact constructions, implementations and versions shown and described.

What is claimed is:

1. An elongated light-guiding element having opposed incident and emission ends between which light is transmitted by internal reflection, the light-guiding element comprising:
    an optical glass core having longitudinally opposed first and second glass-core ends and a glass-core outer surface extending longitudinally between the first and second glass-core ends, the glass core being optically transmissive and exhibiting a glass-core refractive index; and
    an optical layer extending over a predetermined portion of the length of the glass core and being disposed peripherally about the outer surface of the glass core as viewed into a plane orthogonal to a longitudinal axis of the glass core, the optical layer having first and second optical-layer ends and an optical-layer exterior surface extending between the first and second optical layer ends;
    wherein (i) the first glass-core end coincides with the incident end of the light-guiding element and (ii) the optical layer is formed from a first non-glass polymeric material having an optical-layer refractive index corresponding as closely as practicable to the glass-core refractive index such that (a) the glass core and optical layer combine to form a light-guiding element that behaves as similarly as practicable to light-guiding element fabricated from a single, continuous mass of optical material having a refractive index equal to the glass-core refractive index and (b) when the optical layer of the light-guiding element is surrounded by a material having a refractive index lower than the optical-layer refractive index, light received into an incident end of the light-guiding element is transmitted through a portion of the length of the light-guiding element including a portion of the length of the glass-core and a portion of the length of the optical layer by internal reflection.

2. The light-guiding element of claim 1 further comprising an optical cladding disposed about the optical layer, the optical cladding comprising a second non-glass polymeric material and having an optical-cladding refractive index lower than the optical-layer refractive index in order to facilitate the transmission of light through the light-guiding element by total internal reflection.

3. The light-guiding element of claim 1 wherein the light-guiding element is configured for use in an environment in which the polymeric optical layer is surrounded by fluid having a refractive index lower than the optical-layer refractive index in order to facilitate the transmission of light through the light-guiding element by total internal reflection.

4. The light-guiding element of claim 3 wherein the fluid is gaseous matter.

5. The light-guiding element of claim 4 wherein the gaseous matter in the environment in which the light-guiding element is configured for use is air.

6. The light-guiding element of claim 1 wherein the polymeric optical layer is formed about the glass core by injection molding.

7. The light-guiding element of claim 1 wherein the polymeric optical layer is formed from a two-part chemical composition comprising a resin and a catalyst.

8. The light-guiding element of claim 1 wherein
    (a) the optical glass core is a core rod having (i) a uniform cross-sectional area as viewed into spatially separated and mutually parallel planes orthogonal to the core axis, (ii) a uniform cross-sectional geometry as viewed into spatially separated and mutually parallel planes orthogonal to the core axis, and (iii) a first-end numerical aperture over which light is received into the first glass-core end;
    (b) the polymeric optical layer is in the form of a taper having opposed small and large ends corresponding to, respectively, the first and second optical-layer ends between which the optical-layer exterior surface extends;
    (c) the large end of the tapered optical layer is more distant than the small end from the first glass-core end and coincides with the emission end of the light-guiding element; and
    (d) light received into the first glass-core end over the first-end numerical aperture is emitted from the emission end of the light-guiding element over an emission-end numerical aperture that is lower in magnitude than the first-end numerical aperture.

9. The light-guiding element of claim 8 wherein
    (a) the incident and emission ends of the light-guiding element include, respectively, an incident face through which light is introduced into the light-guiding element and an emission face through which light introduced through the incident face is emitted;
    (b) the first and second glass-core ends include, respectively, a first glass-core face coinciding with the incident face of the light-guiding element and a second glass-core face longitudinally opposite the first glass-core face;
    (c) the second optical-layer end includes a second optical-layer face coinciding with the emission face of the light-guiding element; and
    (d) the second glass-core face is recessed with respect to the emission face and embedded within the non-glass polymeric material from which the optical layer is formed such that there is defined between the second glass-core face and the emission face a light-mixing region within which light emitted from the second glass-core face is mixed with light emitted through the glass-core outer surface.

10. An elongated light-guiding element having opposed incident and emission ends between which light is transmitted by internal reflection, the light-guiding element comprising:
  an optically transmissive central glass core having longitudinally opposed first and second glass-core ends and a glass-core outer surface extending longitudinally between the first and second glass-core ends, the glass core being in the form of a rod exhibiting (i) a glass-core refractive index, (ii) a uniform cross-sectional area as viewed into spatially separated and mutually parallel planes orthogonal to the core axis, (iii) a uniform cross-sectional geometry as viewed into spatially separated and mutually parallel planes orthogonal to the core axis, and (iv) a first-end numerical aperture over which light is received into the first glass-core end; and
  an optically transmissive tapered overmold disposed peripherally about, and extending over at least a portion of the length of, the glass-core outer surface, the tapered overmold having opposed small and large ends and an exterior surface extending between the small and large ends;
  wherein (i) the first glass-core end coincides with the incident end of the light-guiding element and accepts light into the light-guiding element over the first end numerical aperture, (ii) the large end of the tapered overmold coincides with the emission end of the light-guiding element and is more distant than the small end from the first glass-core end, and (iii) the overmold is formed from a first non-glass polymeric material having an overmold refractive index corresponding as closely as practicable to the glass-core refractive index such that (a) the combined glass-core and overmold behave as similarly as practicable to a single, continuous mass of optical material having a refractive index equal to the glass-core refractive index and (b) light received into the first glass-core end over the first-end numerical aperture is emitted from the large end of the tapered overmold over a large-end numerical aperture that is lower in magnitude than the first-end numerical aperture.

11. The light-guiding element of claim 10 further comprising an optical cladding disposed about the overmold, the optical cladding comprising a second non-glass polymeric material and having an optical-cladding refractive index lower than the overmold refractive index in order to facilitate the transmission of light through the light-guiding element by total internal reflection.

12. The light-guiding element of claim 10 further configured for use in an environment in which the polymeric overmold is surrounded by fluid having a refractive index lower than the overmold refractive index in order to facilitate the transmission of light through the light-guiding element by total internal reflection.

13. The light-guiding element of claim 10 wherein
  (a) the incident and emission ends of the light-guiding element include, respectively, an incident face through which light is introduced into the light-guiding element and an emission face through which light introduced through the incident face is emitted;
  (b) the first and second glass-core ends include, respectively, a first glass-core face coinciding with the incident face of the light-guiding element and a second glass-core face longitudinally opposite the first glass-core face;
  (c) the large end of the overmold includes an overmold emission face coinciding with the emission face of the light-guiding element; and
  (d) the second glass-core face is recessed with respect to the overmold emission face and embedded within the overmold such that there is defined between the second glass-core face and the overmold emission face a light-mixing region within which light emitted from the second glass-core face is mixed with light emitted through the glass-core outer surface.

14. The light-guiding element of claim 13 further comprising an optical cladding disposed about the overmold, the optical cladding comprising a second non-glass polymeric material and having an optical-cladding refractive index lower than the overmold refractive index in order to facilitate the transmission of light through the light-guiding element by total internal reflection.

15. The light-guiding element of claim 13 further configured for use in an environment in which the polymeric overmold is surrounded by fluid having a refractive index lower than the overmold refractive index in order to facilitate the transmission of light through the light-guiding element by total internal reflection.

* * * * *